United States Patent [19]
Kottkamp

[11] 3,766,355
[45] Oct. 16, 1973

[54] APPARATUS FOR USE WITH ELECTRON BEAM WELDING MACHINES

[76] Inventor: Eckart Kottkamp, Weserstrasse 20, Bremen-Vegesack, Germany

[22] Filed: Aug. 23, 1971

[21] Appl. No.: 173,844

Related U.S. Application Data

[63] Continuation-in-part of Ser. No. 16,663, March 5, 1970, abandoned.

[52] U.S. Cl....... 219/121 EB, 219/125 PL, 250/202
[51] Int. Cl.............................................. B23k 15/00
[58] Field of Search............... 219/121 EB, 121 EM, 219/125 PL; 250/217, 202; 318/577

[56] References Cited
UNITED STATES PATENTS

| | | | |
|---|---|---|---|
| 2,994,763 | 8/1961 | Schultz | 219/123 |
| 3,135,904 | 6/1964 | Durkhiser | 318/31 |
| 3,135,857 | 6/1964 | Von Voros | 219/125 PL |
| 3,387,109 | 6/1968 | Bruma et al. | 219/69 |
| 3,515,877 | 6/1970 | Baxter et al. | 250/202 |
| 3,493,763 | 2/1970 | Hannappel | 250/202 |
| 3,417,222 | 12/1968 | Cannon et al. | 219/121 EB |
| 3,423,589 | 1/1969 | Bardwell et al. | 250/202 |
| 3,527,953 | 9/1970 | Chitayat | 250/219 |
| 3,207,904 | 9/1965 | Heinz | 250/202 |
| 3,449,542 | 6/1969 | Conner et al. | 219/121 EB |
| 3,448,280 | 6/1969 | Blitchington, Jr. et al. | 250/227 |

FOREIGN PATENTS OR APPLICATIONS

644,277   9/1962   Italy.............................. 219/121 EB

*Primary Examiner*—R. F. Staubly
*Assistant Examiner*—Gale R. Peterson
*Attorney*—Ralf H. Siegemund et al.

[57] ABSTRACT

The welding spot produced by radiant welding beam is optically detected and represented by appropriate processing of detector output signal or signals having responded to light emanating from the welding spot.

18 Claims, 13 Drawing Figures

INVENTOR:
Eckart Kottkamp

ATTORNEYS

PATENTED OCT 16 1973 3,766,355

Inventor:
Eckart Kottkamp

ATTORNEYS

APPARATUS FOR USE WITH ELECTRON BEAM WELDING MACHINES

This is a Continuation in Part application of application Ser. No. 16,663 now abandoned, filed Mar. 5, 1970. The present invention relates to a device for determining, detecting and controlling the relative position of the welding spot and of the point of contact of the pieces to be welded or welding joint, particularly for welding machines employing beams of radiant energy, such as electron beams or lasar beams.

Electron beam welding machines are used for welding material which are usually regarded as being rather difficult to weld. However, it is important, particularly for those types of materials to obtain exactly running welding seams, and this requires rather close supervision and control of the welding process. The welding itself is carried out in the interior of a vacuum chamber so that observation of the process is possible only through special windows.

The known methods permit merely welding along straight lines or along circular seams and require additionally, particularly exact positioning and orientation of the workpiece or pieces to be welded, in relation to the beam producing equipment. During welding the direction of progression of the seam and the direction of the beam itself cannot be changed to deviate from prescribed paths. It is, therefore, not possible to weld seams having any kind of course nor is it possible to counteract disturbances. In conventional equipment, there arise two types of disturbances during operation. One is due to the fact that the mechanism may tend to move along a path different from the prescribed one. The other type of disturbance results from undesired deflection of the electron beam as a result, for example, of interaction with unforeseen magnetic stray fields.

The invention has as its primary task to provide for the possibility to correct or to influence the welding process otherwise but in a controlled manner. In accordance with one aspect of the present invention, in the preferred embodiment thereof it is suggested to provide optical means which are placed in the light path of light emanating from the welding spot, to observe the welding spot; the observed radiation is detected by an optical-electrical conversion device to obtain electrical signals which are representative of the position of the welding spot. These electrical signals may be used to control or to adjust the point of detection of the welding beam of radiant energy and of the workpiece or pieces.

While the specification concludes with claims particularly pointing out and distinctly claiming the subject matter which is regarded as the invention, it is believed that the invention, the objects and features of the invention and further objects, features and advantages thereof will be better understood from the accompanying drawings in which:

Figure 1:
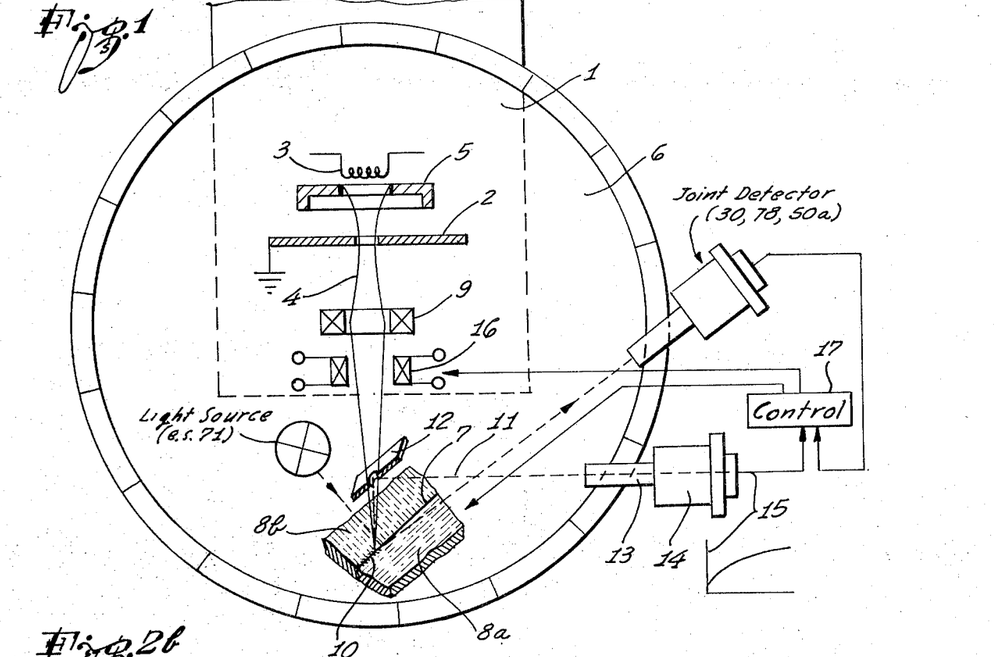
FIG. 1 illustrates somewhat schematically a view into an electron beam welding machine including particularly an electron beam gun and showing detection means for determining the position of the welding spot.

Proceeding now to the detailed description of the drawings, in FIG. 1 thereof there is illustrated an electron beam gun 1 located in a vacuum chamber 6. The electron beam gun 1 includes an anode and a tungsten cathode. The cathode 3 is heated and is connected to a suitable source of voltage potential to assume a very large, negative voltage relative to anode 2. The cathode emits electrons, and they are accelerated by and towards anode 2. The electrons traverse an aperture in the anode and form an electron beam 4.

The strength or intensity of the thus formed electron beam 4 can be adjusted by varying the voltage applied to a control grid 5 interposed between anode and cathode. The grid 5 has a negative potential relative to cathode 3. As the electron beam traverses the opening in anode 2, it propagates towards a joint 7 of two workpieces 8 to be welded. The beam diameter is adjusted to a suitable value by operation of a focusing coil 9.

As the beam impinges upon the workpieces, the spot 10 of interaction is, of course, heated and emits light. The welding spot, therefore, serves as a source of light including a light beam 11, which is deflected by means of a mirror 12 and propagates to a particularly positioned, optical system 13. For the sake of convenience, it may be assumed, that the optical axis of optical system 13 traverses the center of welding spot 10 when having the desired position.

Optical system 13 provides the optical input for an optical - electrical converter 14 which converts the light intensity into electrical signals, which in turn can be taken from output channels 15 of converter 14. The magnitude of these output signals depends upon the angle of incidence of light beam 11 as it enters optic 13. Furthermore, these signals depend upon lateral displacement, if any, of the center of the welding spot in relation to the optical axis of optical system 13 and as redirected by mirror 12 onto the joint 7 between workpieces 8.

It is advisable to distinguish relative displacement of the bright center of the welding spot in two directions, in the plane of welding and beam - workpiece interaction in relation to the optical axis as traversing that plane. For example, an X-Y coordinate system may be assumed in the plane of interaction of beam and workpieces, and this coordinate system may have the optical axis where traversing that plane as point of origin. Furthermore, it can be assumed that the coordinate system is optically related by optical system 13 onto converter 14 and the converter is constructed to provide and to process separately signal representation of the welding spot in the X-Y system. Therefore, there will be two output signals in dual channel 15, each one being indicative of the relative position of welding spot 10 along one coordinate axis in this X-Y system.

It may happen that uncontrolled, possibly even unforeseen exterior influences deflect the electron beam so that the welding beam is not focused any longer onto the joint 7. Such deflection and displacement of the welding spot causes immediately, for example, one or both electrical output signals in dual channel 15 to vary, and that variation can be used for correcting the position and direction of the electron beam, or it can be used merely as indication of the position of the welding spot. For obtaining automatic control the output signals in channels 15 are fed through suitable control and regulating circuitry 17 to a beam deflecting system 16 included in chamber 6 along beam 4 and causing the electron beam to be deflected in accordance with the signal as derived from circuit 17. This way the electron beam can be deflected to return to its normal position in spite of such external influences, the normal position being defined for example in that the brightest point of the welding spot, usually its center, is traversed by the optical axis of system 13-14.

The deflection system 16 is constructed also as dual system to operate likewise in relation to the X-Y coordinate system. Thus, one can say that the X-Y coordinate system is in reality defined by the operation of the dual coil system 16 in relation to the resulting displacement of the welding spot in two, possibly orthogonal directions, and in the plane of interaction of electron welding beam and workpieces.

The optical system 13 is preferably constructed as a telescope optic so that the light beam is transmitted to converter 14 almost distortion free, i.e., linearly. Furthermore the optic should be constructed to permit adaptation to variation in the size of the area from which light is being detected. A suitable, preferably variable diaphragm may be included in the optical system, particularly at the common focal point between objective and ocular therein, so that the shape of the light beam 11 as propagating to converter 14 can be controlled.

Figure 2:
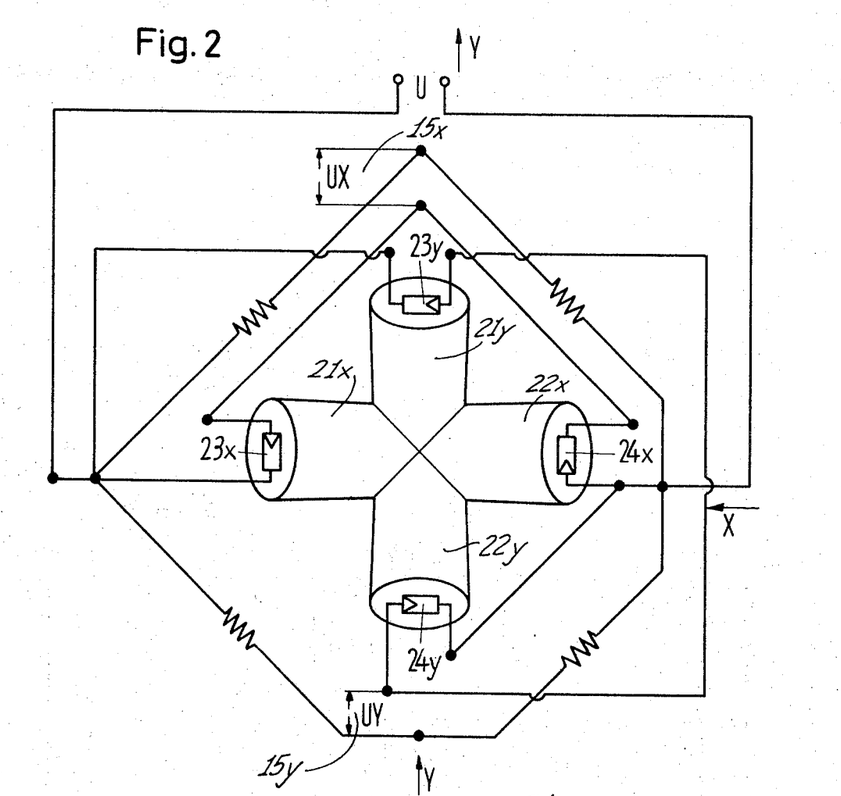
FIG. 2 illustrates schematically an electrical circuit in which the signals gained by the detector shown in FIG. 1 are processed and including additionally a top view of light conductors employed in the optical entrance path for the detecting means.
Figure 2A:
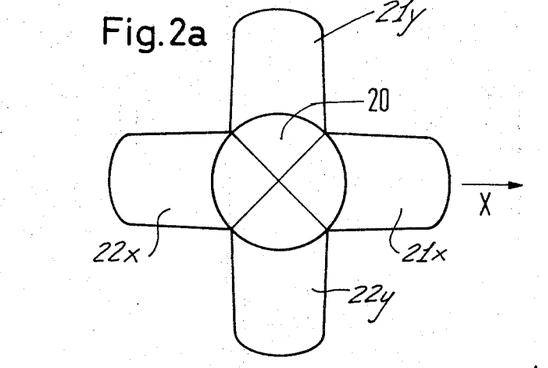
FIG. 2a illustrates a bottom view of common light conductors of FIG. 2.

Details of converter 14 and of its immediate optical input are shown in FIG. 2 and 2a. There are four light conductors, denoted respectively 21X, 21Y, 22X and 22Y; each having an entrance window in form of a quadrant sector, which four windows establish a circular window 20. The optical system 13 projects light from the welding spot onto that window 20. The optical axis of optical system 13 may terminate in the center of window 20.

If the spot as so projected is centrally located in relation to the four quadrant sectors of window 20, all four light conductors receive equal amounts of light. In case there is a relative displacement in the welding spot, for example along the X coordinate, light conductor 21X will receive more and conductor 22X will receive less light or vice versa, depending upon the direction of that displacement along the X axis. The situation as to displacement along the Y coordinate is analogous.

The converter 14 now includes four detectors such as photo-resistors connected in bridge circuits from which the output signals are fed to the two output channels 15X and 15Y. In order to operate in the planar system with X and Y coordinates, and in order to permit infinitely variation of detection and control in either direction, there are provided two rather sensitive Wheatstone bridges, one for each of the axes of the X-Y system.

There are provided accordingly photo resistors 23X and 24X respectively disposed in the exit windows of light conductors 21X and 22X, and there are photo resistors 23Y and 24Y respectively disposed in the exit windows of light conductors 21Y and 22Y. The photo resistors 23X and 24X are electrically interconnected to provide a first Wheatstone bridge circuit, in the following also called the X bridge. Photo resistors 23Y and 24Y are combined in a second bridge, in the following called the Y bridge. These two bridges are biased and supplied by similar voltages designated with U and applied across one diagonal of each bridge. Each bridge of course includes additionally resistors to establish and to complete a regular Wheatstone bridge.

As the supply voltage U is applied to each of the two bridges, one obtains two output signals UX and UY, respectively derived from across the other diagonal of the X bridge and from the other diagonal of the Y bridge. These signals UX and UY are applied to output channels 15X and 15Y respectively of the converter circuit.

In order to obtain an optimum output signal it is of advantage and is a particular feature of the invention to adjust the numerical aperture of the optical system so that the area of the welding as optically detected in relation to window 20 has a cross-sectional area about equal to that window's area.

It can readily be seen that output signal UX, for example, is processed in the circuit 17 to operate that part of the coil system 16 which will cause a deflection of the electron beam to be effective in and along the X-axis in the plane of interaction of beam and workpieces. The signal UY is accordingly effective for an orthogonal beam deflection in that plane.

Figure 2B:
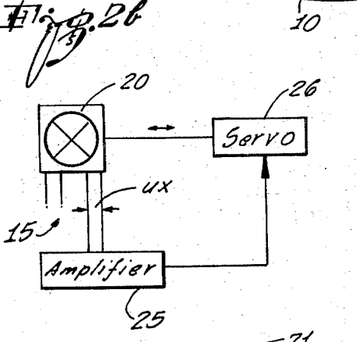
FIG. 2b illustrates schematically a follow-up control system for the detecting means as employed in the system shown in FIG. 1.

In accordance with another aspect of the present invention the electron beam may undergo intentional directional variations to follow a complex contour for the welding path and joint. In this case, as shown in FIG. 2b, there must be follow-up control for obtaining proper position detection. In particular, the entrance window 20 (but possibly also optic 13) must be laterally displaced and along the X-Y coordinate system as projected into the plane of window 20. The bridge voltages UX and UY identifying the unbalance as between radiation from the welding spot and the pattern of window 20 are used to control servomotors laterally shifting the light conductors 21 and 22 until balance is restored by UX and UY being at least approximately zero. The resulting position of the light conductor arrangement is then per se a representation of the position of the welding spot.

As illustrated somewhat schematically in FIG. 2b there is provided an amplifier 25, for example, having as its input the voltage UX as derived from the X bridge shown in FIG. 2. The output of amplifier 25 is used to control a servomotor 26 which shifts the light conductor arrangement and here particularly the entrance window arrangement 20 along the X coordinate as projected into the plane of the window. This way the detector system is adjusted to follow any change in position of the welding spot. Of course, in this particular case the voltage UX is not used to control the electron beam deflection in and along the X-axis. Instead, the beam deflection system will be controlled by a welding joint detector mentioned below. The follow-up for the Y coordinate will be analogous.

The operation can be of a different kind as to follow-up. Assuming the desired position of the welding spot is in representation of a complex welding path contour which, in turn, is represented by electrical signals which represent the relative position of the welding joint. These signals can be used as a reference representation in a follow-up control. For example, such a signal (representing the X coordinate of the welding curve in representation of the desired welding spot position) is furnished by a variable resistance as represented by a potentiometer 27 shown in FIG. 2c. A joint detector 30 detects the position of the welding joint, just ahead of the welding spot, and provides the reference for the desired welding operation by the electron beam. The link 30–27 represents symbolically the providing of this reference as representation of the joint position by potentiometer adjustment.

Figure 2C:
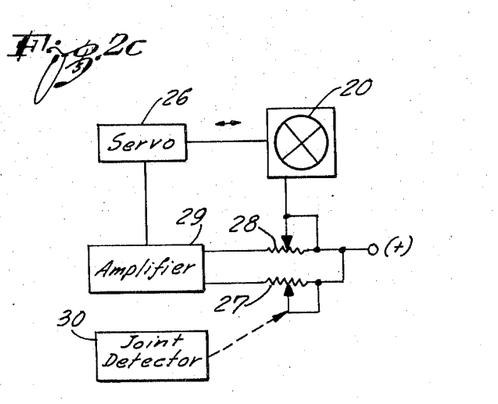
FIG. 2c illustrates a different kind of follow-up equipment, also in block diagram, to be used in equipment as shown in FIG. 1.

The position of the welding spot detector arrangement, including light conductor entrance window 20, are likewise represented by signals, in that, for example, that arrangement moves the glider of a potentiometer 28. The signal which can be taken from potentiometer 28 thus represents the actual detector position in the X coordinate. An amplifier 29 responds to the difference in the signals respectively representing actual and desired positions, and by operation of follow-up control the output of amplifier 29 energizes the servomotor 26 to shift the window arrangement 20 along one axis until the desired position of the detector arrangement has been obtained.

That position of the welding spot detector 20, particularly of the entrance window pattern thereof, now defines the desired position or an equivalent thereof, of the welding beams. The voltage UX in channel 15X of the bridge circuit of the detector arrangement controls the electron beam deflecting coil system 16 as far as it produces deflections of the electron beam along the X-axis.

There may be analogous arrangement for the Y coordinate, but it may well happen that only deflections along the X coordinate system are required. In the general case however there are reference signals defining the desired welding spot position within the plane, and they control the position of the detector arrangement, and the detector arrangement in turn, through its output voltages UX and UY, controls the electron beam deflection control system 16 so that the position of welding spot 10 changes in accordance with the change of detector position.

In accordance with a modification of the preferred embodiment of the present invention, four solar cells are substituted for the four light conductors and for the photo resistors as shown in FIG. 2. The solar cells convert directly the incident light into an electrical output signal. This arrangement is schematically indicated in FIG. 3a, showing a cell arrangement which includes four cells 31X, 31Y, 32X and 32Y. The solar cells are electrically combined in two bridges, one for each of the coordinate axes X and Y. The outputs of these cells may be used as described with reference to FIG. 2. However, a preferred circuit is described below with reference to FIG. 3.

The arrangement as shown in FIG. 3a has however, the disadvantage when used in a circuit arrangement as shown in FIG. 2, that in case of concurrent deflections in the X and in the Y directions the relative imbalance of the output signals differs from the case where there is a significant deflection in only one of the coordinate directions. This can be avoided if one uses an arrangement of cells as shown in FIG. 3b.

The solar cells of FIG. 3b are provided as small, incremental cells arranged in the form of a checkerboard. The hatched areas denote cells 35Y to be used collectively for the Y bridge; the unhatched areas denote cells 35X to be used collectively for the X bridge. The 35Y cells located above coordinate line X form one branch of the Y bridge, the cells 35Y below coordinate axis X form the other branch of the Y bridge. The cells 35X to the left and to the right of the coordinate line Y are analogously arranged in the X bridge.

This checkerboard arrangement of interleaved cells has the advantage, that upon shifting of the welding spot and upon a resulting displacement of the light beam as impinging upon the checkerboard cell arrangement, one obtains similar electrical detuning in each half of the respectively associated bridge, corresponding to that deflection and in a linear relationship therewith.

Figure 3:
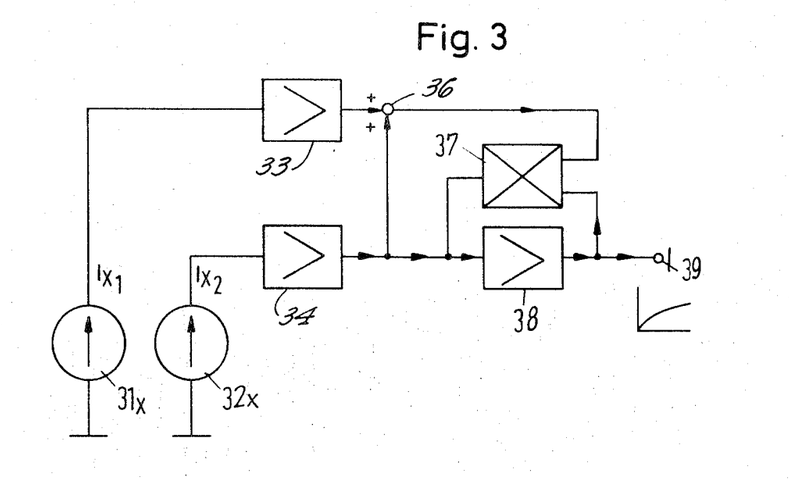
FIG. 3 illustrates schematically a block diagram for an electric circuit processing the outputs of detectors to form a quotient of the detector signals.
Figures 3A, 3B:
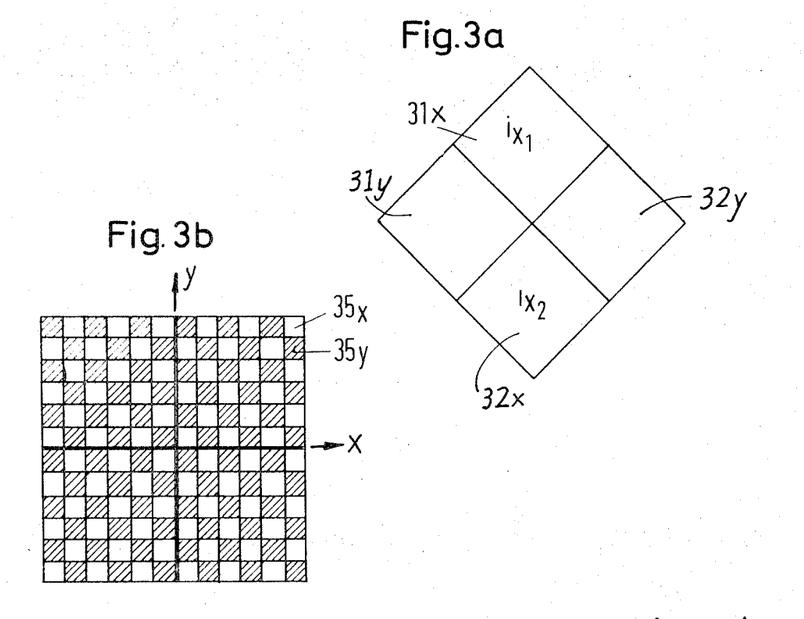
FIG. 3a shows somewhat schematically an arrangement of solar cells some of which serving as input elements for the circuit shown in FIG. 3.
FIG. 3b shows a checkerboard type of arrangement of detector cells.

FIG. 3 illustrates a circuit, to be used preferably for processing the signals of the detector cell arrangement in FIGS. 3a and 3b but which can also be used for processing the signals developed directly in the detectors 23 and 24 of FIG. 2. The purpose of the circuit in FIG. 3 is to eliminate brightness variations of the welding spot as a whole. FIG. 3 illustrates processing of the signals representing welding spot deviations in the X coordinate axis. There is a similar circuit for the Y coordinate axis. Each of these circuits can be called a quotient bridge.

The short circuit (output) currents of the two solar cells 31X and 32X are applied to suitable amplifiers 33 and 34 to provide respectively two proportionate voltages. These voltages are fed to a particular dividing circuit. The dividing circuit includes, optionally, a summing point 36 in which the two output voltages of amplifiers 33 and 34 are algebraically added to obtain the true sum of the inputs of the two solar cells. The sum signal is applied to one input of a multiplying circuit 37.

The output of multiplying circuit 37 is combined with the output, for example, of amplifier 34 (signal from detector 32X) to serve as input for an amplifier 38. In other words, amplifier 34 holds the output of multiplying circuit 37 to be equal to the amplifier output, and that output is fed to amplifier 38. The output signal of amplifier 38 is the other input for the multiplying circuit 37, and the circuit adjusts itself so that the second input is equal to the ratio of the output signal of the amplifier 34 over the sum of the outputs of amplifiers 34 and 33.

An output signal can now be taken from an output terminal 39 of amplifier 38 which signal is proportionally representative of the position of the welding spot in the X-axis. One can readily see that the input for amplifier 38 may be taken from the output of amplifier 33, and it can also be seen that the summing point 36 could be omitted. In either case, the resulting output will not include overall brightness variations of the welding spot.

This quotient bridge offers the advantage that brightness differences of the welding spot, which may occur without displacement of the welding spot or without departure of the welding spot from the required path can be compensated. In other words the output signal in terminal 39 represents directly and in a linear relationship, welding spot deviations independently from normal brightness variations of the welding spot. In case of a Wheatstone bridge as described the signals UX and UY are also proportionate to the absolute brightness of the welding spot.

Figure 4:
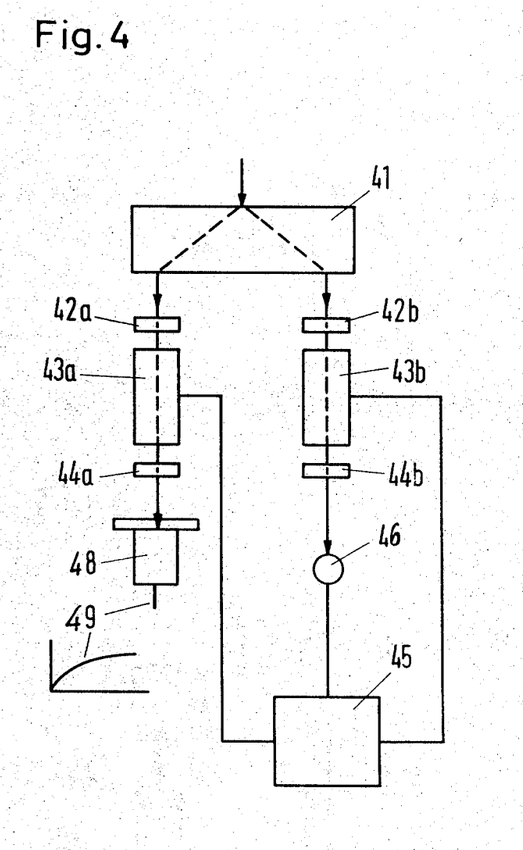
FIG. 4 illustrates somewhat schematically a circuit for stabilizing brightness differences as they may arise in the equipment as illustrated in the preceding figure.

FIG. 4 illustrates another example for stabilizing the overall brightness intensity of the light beam as detected. The equipment shown in FIG. 4 is in essence and in parts interposed between the optical equipment 13 observing the welding spot and a light-to-electric-signal converter, such as disclosed in FIGS. 2 or 3a. The additional optical equipment may also supplement brightness balancing as disclosed in FIG. 3b. In the general case, the equipment shown in FIG. 4 is a part of the overall optical path between the welding spot and the detector circuit elements.

Light leaving the optical system 13 is passed first through a prism-like, ray divider or beam splitter 41 producing two output branches for the incident light, i.e., the incident light is split into two components. The light path for each component of this split beam includes polarizing filters 42a and 42b, respectively, to provide linear polarization in particular planes. Next there is provided a Kerr cell in each path, 43a and 43b. A Kerr cell has the specific characteristic of rotating the plane of polarization of incident polarized light and over an angle in dependence upon electrical signal applied to its electrodes. Therefore, the particularly polarized components as leaving the respectively positioned polarizing filters 42a and 42b have their plane of polarization rotated by the respective Kerr cells. Each path includes another polarizing filter, 44a and 44b, operating in fact as analyzers.

Assuming, for example, that the planes of polarization of the filters in each path are the same, then in dependence upon the degree of rotation provided by the respective Kerr cells light entering the filters 44a and 44b will be attenuated. Thus, the light intensity as permitted to pass these filters is directly dependent upon the voltage signal applied to the respective Kerr cells.

One of the two optical paths called branch -a, has converter 48 disposed at its optical output side. Converter 48 furnishes a welding spot, position dependent signal as aforedescribed. There are also dual output channels 49 which may connect to the electron beam deflecting system to automatically control the position of the location of electron beam -workpiece interaction.

In order to obtain a particular, constant light intensity in branch -a, particularly of the beam component leaving filter 44a, one proceeds as follows. At the light exit side of the parallel branch, -b, i.e., adjacent the exit of filter 44b, there is positioned a photocell or photodetector 46 providing one input for a control and regulating circuit 45. The circuit 45 includes a source for a reference signal and provides an output which controls both Kerr cells 43a and 43b in response to comparing the photodetector output with the reference signal.

This optical path -b, therefore, is provided for stabilizing the light intensity as leaving each branch. The rotation for the polarization plane as provided by both Kerr cells is controlled so that the light intensity in branch -b and, therefore, also in branch -a remains constant. Thus the optical input, i.e., the light beam component incident upon electro-optical converter 48 is rendered independent from welding spot intensity variations as far as emission of light is concerned.

The optical equipment shown in FIG. 4 can be changed in that the Kerr cells 43a and 43b are substituted by devices which physically rotate polarizing filters 42a and 42b or analyzing filters 44a and 44b respectively in unison, so as to provide relative rotation between each polarizing and the associated analyzing filter. The overall effect is similar except that the Kerr cells operate at a higher speed.

Figures 5, 5A, 6:
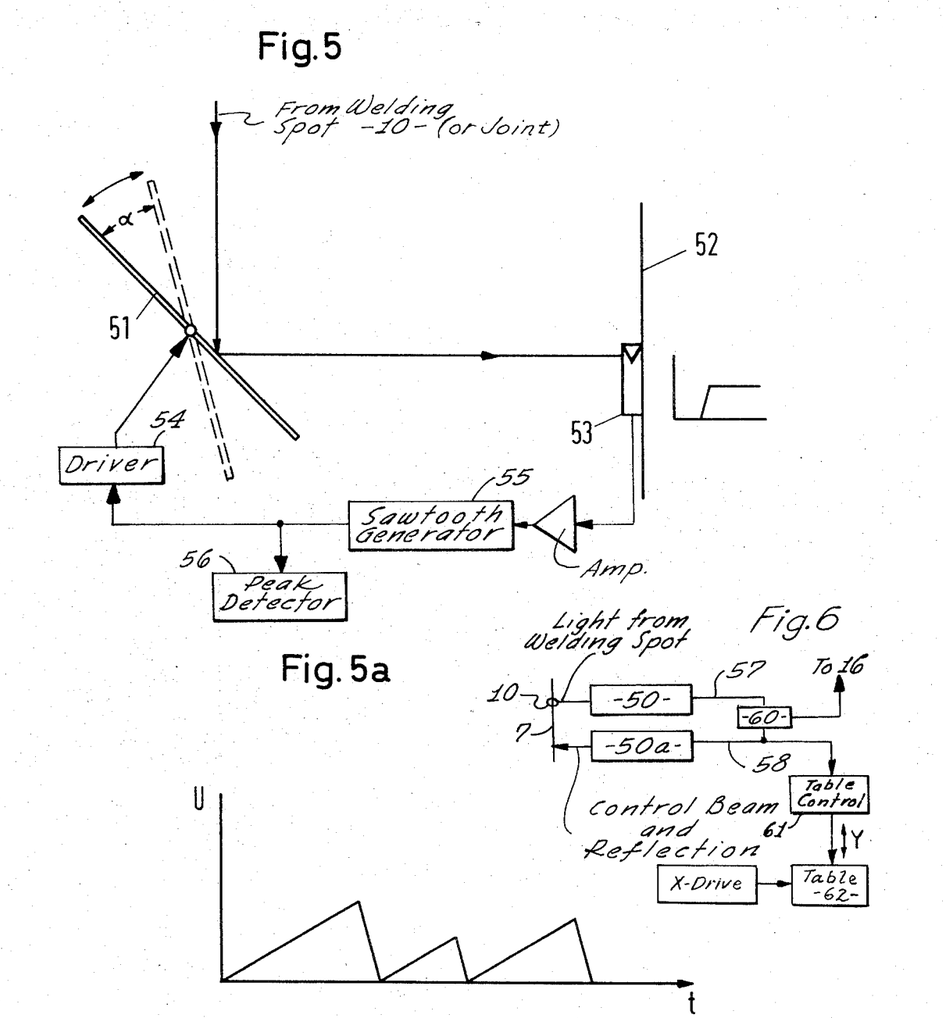
FIG. 5 illustrates a mirror arrangement for determining the position of a welding spot and illustrating in particular that part of the optical input path for the detector element as it may be used in the device shown in FIG. 1 and others.
FIG. 5a shows the output of a sawtooth generator included in the circuit shown in FIG. 5.
FIG. 6 shows somewhat schematically a system for welding process control.

FIG. 5 illustrates another embodiment for determining the position and location of the welding spot. Again, it is assumed that there is provided a suitably positioned optical system such as 13 in FIG. 1 which observes the welding spot. The light leaving that optical system is incident upon a mirror 51 which is pivotable to offer variable angles of reflection to the incident beam. The pivot axis is oriented so that the beam is pivoted in effect along one of the axes of the coordinate system as optically relates by the optical system from the plane of electron beam-workpiece interaction to a plane 52.

Mirror 51 is driven by a reversible driver 54 for angular position control thereof. The driver is under direct control of a sawtooth generator 55 so that the pivot angle $\alpha$ of the mirror is determined in any instant by the output of sawtooth generator 55. The plane 52 includes, for example, a centrally disposed electro-optical converter in the form of a single detector cell 53. The output of cell 53 is amplified, shaped and used to trigger and reset sawtooth oscillator generator 55 which begins a new run with each resetting.

Thus, during swivel motion of mirror 51 the deflected beam will pass over plane 52 and soon will be incident upon the cell 53, whereupon sawtooth generator 55 is triggered and reset. This in turn causes the mirror to return to the starting position. That mirror position in relation to the optical axis of the system as deflected represents a zero scale position, represented by zero output of oscillator 55 when reset.

The peak amplitude of the output signal of sawtooth generator 55 at the time of resetting is indicative proportionally of the position of the welding spot in relation to that scale. The peak amplitude is detected by a peak detector 56, and a control signal can be derived therefrom for controlling the deflection coil 16 for positioning the electron beam in the particular one coordinate direction.

The arrangements described above serve particularly for the detection of the position of the welding spot in any instant, i.e., of the point of interaction of the focused electron beam with the material to be welded. However, it may be required in cases to determine also the position of the joint, i.e., of the particular location, line or area where welding heat is to be developed. This is particularly important if the workpiece or pieces are moved underneath the welding beam, and if there is a deviation from the prescribed path. The transportation of the workpieces should be made subject to control in order to compensate such deviations.

In accordance with the present invention, it is, therefore, suggested to direct a probe or search beam of light from a homogenic light source onto the workpiece, and to deflect that control beam, so that the resulting light spot travels over the workpieces and particularly passes over the joint.

The reflection of that control beam is separately observed and passed into a separately provided optical electrical converter. There may be provided suitable filters, diaphragms and shading means to eliminate stray light from the welding spot as it may enter that second path. In particular, the control beam should be poor in radiation that is characteristic in the emission by the welding spot, and the path of optical detection of the reflection of the control beam, just ahead of the welding spot, should include filter that blocks the characteristic emission lines of the welding spot, but passes the control beam radiation. Again, the output of the optical electrical converter is a signal indicative and proportional to the position of the joint.

Figure 7:
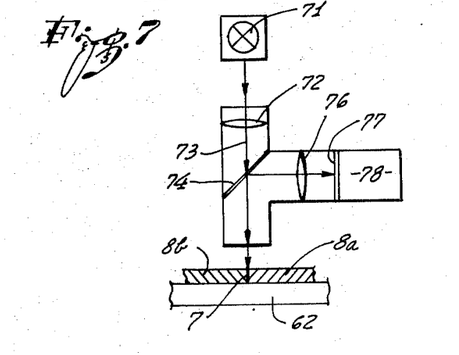
FIG. 7 shows schematically a welding joint detecting apparatus to be used for welding spot follow-up adjustment.

An example for such a joint detector (30 above, or 50a below) is shown in FIG. 7. A source 71 of monochromatic radiation passes through an optic 72 so as to provide a control beam of parallel rays 73 of desired diameter. The beam traverses a partially transmissive mirror 74 and propagates towards workpiece 8 and joint 7 on table 62. The beam intercepts the workpiece and joint, just ahead of the welding spot, and is reflected thereat. The reflected control beam returns and is partially reflected by mirror 74, reaches a detector optic 76 and traverses a filter 77. The filter 77 rejects the characterical radiation of the workpiece material, particularly as emitted by the welding spot. However, the filter passes the radiation of the control beam. The frequency of the latter radiation should be as far as possible from any strong emission line of the material and particularly far from the wave length that corresponds to the color temperature of the welding spot. Equipment 78 may include optical means to provide an image of the workpiece and of the joint. Means are included in the equipment 78 that provide electrical signals in representation of the relative position of the joint in the image plane. By way of example, there may be a CRT-type scanner for detecting the relative position of the joint by scanning the image as provided by the illustrated device behind filter 77. The detector signals as produced, are used as reference for the control of the relative position of the welding spot.

FIG. 5 can readily be understood as representing an alternative example for the joint detector in accordance with this particular aspect of the invention. In order to determine the position of the joint along which a welding beam is to be produced, a control beam is incident upon a pivotable mirror such as 51 and is deflected at a variable angle by operation of the driver and sawtooth oscillator of that system. The variably reflected control beam now impinges upon the workpiece or pieces, and the beam as reflected from and by the workpieces intercepts plane 52. Each time the beam passes over the joint, there is a change in reflection and the particular electro-optical converter for that case, equivalent to cell 53, receives that modified reflection and provides a trigger signal to reset the sawtooth generator which controls the mirror drive. Filtering is provided also in this case to eliminate welding spot radiation from the path of reflected control beam. Again, and starting from a particular zero position, the amplitude of the sawtooth signal is proportionally indicative of the position of the welding joint in relation to the particular reference line.

As schematically shown in FIG. 6, the position of the welding spot 10 as defined by electron beam-workpiece interaction is ascertained by a channel 50 which may include an optical input system as shown in FIG. 1 and it may also include the equipment shown in FIG. 5. The output line 57 of that channel provides the output of peak detector 56, preferably as a steady signal.

There is an analogous channel 50a observing joint 7, ahead of spot 10 but as close thereto as possible. This channel 50a includes a light source, a reflecting mirror, a sawtooth generator and a detector cell as well as a peak detector whereby the sawtooth generator is reset each time the variably directed control beam is intercepted by joint 7 and, as observed by the detector cell monitoring the reflection of the control beam by the workpiece. The peak detector in channel 50a provides a signal and the resulting signal in output line 58 is a steady signal representative of the peak detector output.

In general, the output in line 58 represents the position of the joint in the Y-direction, and the peak detector output of channel 50 in line 57 represents the current, actual position of the welding spot in, for example, the Y-coordinate axis. The two pivotable mirrors in the channels 50a and 50 provide scanning in the same coordinate direction. The two lines 57 and 58 feed their respective output signals to a control circuit 60 whereby the output of channel 50a serves as follower control, reference signal establishing the desired value for the elctrode beam positioning and tracking control. The welding may generally progress in the X-direction in that the work piece table 62 is shifted in that direction. The contour of the joint may be understood as deflection thereof in the Y-direction. The beam progressively welds as the table shifts in the X-direction, but relative displacement is needed in the Y-direction.

However, the welding beam deflection angle should not exceed angle of a few degrees, preferably not 2°, for reasons of available and required beam energy, and further for reasons of accurate focussing. In order to permit the welding beam to follow joint and desired seam contour which has a correspondingly larger amplitude deviation in the Y-coordinate, the output measuring signal from channel 58 is fed to a table position controller 61 for shifting the table 62 with the work pieces 8 to be welded, in the Y-direction. The controller may additionally receive a constant reference signal to operate in a feedback loop. Thus, the table 62 is shifted along the Y-coordinate but in direction opposite to amplitude excursions of the welding joint in the X-Y plane and particularly in the Y-direction. Thus, the position control for table 62 maintains a particular relative position of the welding joint in the Y-direction, underneath the welding beam and at least approximately corresponding to "zero" welding beam deflection angle as effective along the Y-coordinate. This mechanical follower control operates comparatively slow and the faster operating beam deflection control 60 – 16 eliminates residual errors due to the time lag of table position control. The deflection control range is quite small here.

The invention is not limited to the embodiments described above but all changes and modifications thereof not constituting departures from the spirit and scope of the invention are intended to be covered by the following claims.

I claim:

1. Apparatus for determining, detecting and controlling the position of a welding spot as resulting from interaction of a beam of radiant energy and a workpiece or workpieces in relation to a joint to be welded, comprising:

optical means oriented to observe the light rays emanating from the welding spot;

first detecting means disposed in relation to the optical means to be responsive to the light rays as observed and providing electrical signals in response thereto, the optical means and the first detecting means establishing reference position for a scale in relation to which the welding spot is to be ascertained;

a source of monochromatic light directing a light beam towards the joint in the immediate vicinity of but removed from the welding spot, the light being poor in radiation characteristic in the emission by the welding spot;

second detecting means disposed in relation to the joint for providing electrical signals representing the relative position thereof and including filter means narrowly responsive to said monochromatic light as reflected by the workpiece near the joint and to block reception of radiation emission from the welding spot by the second detecting means;

circuit means connected to the first and second detecting means to receive the electrical signals and providing for position control signals for the position of the welding spot in relation to the joint; and means connected to the circuit means and responsive to the control signals for controlling the position of the welding spot in relation to the joint, the position of the latter being detected by the second detecting means and defined on basis of the electrical signals as provided by the second detecting means.

2. Apparatus as in claim 1, the first detecting means including two pairs of detector cells positioned in relation to the optical means, so that luminous inputs of the cells of the pair of the two pairs vary inversely when the welding spot is deflected along a first axis, the liminous inputs of the cells of the other pair vary inversely when the welding spot is deflected along a second axis transverse to the first axis.

3. Apparatus as in claim 1, the first detector means including at least two detector cells, inputs and outputs thereof varying inversely when the welding spot is displaced along a particular axis, the circuit means processing the outputs of the two cells; and compensating means included in the apparatus to provide compensation for brightness variations of the welding spot.

4. Apparatus as in claim 3, the compensating means being included in the circuit means and operating to form a signal representing the quotient of the two detector outputs, the quotient signal provided as representation of welding spot position.

5. Apparatus as in claim 3, the compensating means including a beam splitter in the path of the optical means, one component of the split beam being passed to the first detecting means;

variable light attenuating means included in the optical path of the one component;

a second component of the split beam being received by a light detector providing an output; and means for controlling the light attenuating means in response to the output of the light detector.

6. Apparatus as in claim 5, there bing a first and a second polarizing filter and a first and a second analyzing filter included in the path of the one and of the second component of the split beams, respectively; there being further means to provide relative rotation of the plane of polarization as between the planes of polarization of the components as leaving the polarizing filters and the respective planes of polarization of the analyzing filters, the output of the light detector controlling the relative rotation in both paths.

7. Apparatus as in claim 6, the relative rotation being provided by Kerr cells.

8. Apparatus as in claim 3, the detector cells subdivided into a plurality checkerboard arranged cells.

9. Apparatus as in claim 1, the source of light providing a movable beam, there being means to control the motion of the beam, the deflecting means including means to control return of the beam to a home position when the beam is reflected by a spot about to be subjected to welding; and means connected to derive a position representing signal from the motion control means at the time of return.

10. Apparatus as in claim 1, the position representing signal and the signal provided by the circuit means being fed to control means coupled to the source of radiant energy to control the direction of the beam of radiant energy.

11. Apparatus as in claim 1, the optical means including a pivotable reflector disposed for variably directing light rays as observed; a sawtooth generator operatively connected to the reflector to control the position thereof; the detecting means including a detector positioned to be responsive to light rays as observed and deflected by the reflector during pivoting thereof under control of the sawtooth generator; means for connecting the detector to the sawtooth generator for resetting the generator upon detection of the deflected rays by the detector; and circuit means connected to the sawtooth generator for being responsive to the output signal peaks thereof in representation of the welding spot position.

12. Apparatus as in claim 2, the first detector means including at least two detector cells, optical inputs and electrical outputs thereof varying inversely with displacement of the welding spot along a particular axis, the circuit means including a bridge circuit which includes the detector cells.

13. Apparatus as in claim 12, there being means to control the direction of the beam of radiant energy, the bridge circuit controlling the last mentioned means.

14. Apparatus as in claim 1, there being means to control the direction of the beam of radiant energy, the circuit means connected to control the last mentioned means in response to the position representing signal.

15. Apparatus as in claim 1, there being means to control the position of the first detecting means, the circuit means connected to control the last mentioned means in response to the position representing signal to follow the position of the welding spot.

16. Apparatus as in claim 1, the optical means including a telescope optic.

17. Apparatus as in claim 1, the second detector means including means to provide a signal representation of the workpiece location about to be subjected to welding and means responsive to the signal representation to shift the position of the workpieces.

18. Apparatus as in claim 17, and including means responsive to the electrical signal and to said signal representation to control deflection of the beam of radiant energy in response to comparison of the two signals.

* * * * *